(12) United States Patent
Ito et al.

(10) Patent No.: US 11,977,042 B2
(45) Date of Patent: May 7, 2024

(54) GAS SENSOR AND METHOD FOR MANUFACTURING SAME

(71) Applicant: KOA CORPORATION, Ina (JP)

(72) Inventors: Chika Ito, Ina (JP); Ken Takahashi, Minowa-Machi (JP); Tetsuro Tanaka, Minowa-Machi (JP); Kenichi Iguchi, Ina (JP)

(73) Assignee: KOA Corporation, Nagano (JP)

( * ) Notice: Subject to any disclaimer, the term of this patent is extended or adjusted under 35 U.S.C. 154(b) by 839 days.

(21) Appl. No.: 17/040,332

(22) PCT Filed: Mar. 20, 2019

(86) PCT No.: PCT/JP2019/011697
§ 371 (c)(1),
(2) Date: Sep. 22, 2020

(87) PCT Pub. No.: WO2019/182010
PCT Pub. Date: Sep. 26, 2019

(65) Prior Publication Data
US 2021/0018456 A1   Jan. 21, 2021

(30) Foreign Application Priority Data

Mar. 23, 2018 (JP) .................................. 2018-057302

(51) Int. Cl.
*G01N 27/12* (2006.01)
*G01N 27/407* (2006.01)
(Continued)

(52) U.S. Cl.
CPC ........... *G01N 27/128* (2013.01); *G01N 27/12* (2013.01); *G01N 27/125* (2013.01);
(Continued)

(58) Field of Classification Search
CPC ..... G01N 27/128; G01N 27/12; G01N 27/125
See application file for complete search history.

(56) References Cited

U.S. PATENT DOCUMENTS 4,346,585 A    8/1982 Yasuda et al.
6,537,431 B1 *  3/2003 Tatsumoto ......... G01N 27/4071
                                                 204/426

(Continued)

FOREIGN PATENT DOCUMENTS

EP          0121905 B1 *  3/1987
JP          S53-29194 A   3/1978
(Continued)

*Primary Examiner* — Ryan D Walsh
(74) *Attorney, Agent, or Firm* — Carrier, Shende & Associates P.C.; Fulchand P. Shende; Joseph P. Carrier (57) ABSTRACT

An oxygen sensor for detecting gas concentration based on either an electric current value or a resistance value measured when a voltage is applied to a sensor element includes gaps formed between electrodes arranged in an element main body and ridges where surfaces of an element touch each other. These gaps will be escaping parts for expansion and contraction of electrode material that accompany thermal expansion and contraction of a sensor main body, and concentration of thermal stress at edge parts of the element main body may thus be eliminated, thereby alleviating thermal stress on the oxygen sensor. This allows provision of a gas sensor that controls generation of cracks in the element and that is stably usable over a long period of time.

6 Claims, 11 Drawing Sheets

(51) Int. Cl.
   *G01N 27/416* (2006.01)
   *G01N 27/419* (2006.01)

(52) U.S. Cl.
   CPC ..... *G01N 27/4071* (2013.01); *G01N 27/4073* (2013.01); *G01N 27/4161* (2013.01); *G01N 27/419* (2013.01); *C04B 2235/3225* (2013.01); *C04B 2235/3227* (2013.01)

(56) References Cited

U.S. PATENT DOCUMENTS

| | | | |
|---|---|---|---|
| 2003/0146093 A1* | 8/2003 | Akiyama | G01N 27/4071 204/431 |
| 2013/0019655 A1* | 1/2013 | Nakagawa | G01N 27/419 73/31.05 |

FOREIGN PATENT DOCUMENTS

| | | | |
|---|---|---|---|
| JP | S54-67497 A | | 5/1979 |
| JP | H03148029 A | * | 6/1991 |
| JP | H04-115056 U | | 10/1992 |
| JP | H08-43342 A | | 2/1996 |
| JP | 2000-055857 A | | 2/2000 |
| JP | 3811440 B2 | * | 8/2006 |
| JP | 2007-085816 A | | 4/2007 |
| KR | 19990039314 U | * | 11/1999 |
| WO | WO-2022264918 A1 | * | 12/2022 |

* cited by examiner

GAS SENSOR AND METHOD FOR MANUFACTURING SAME

TECHNICAL FIELD

The present invention relates to a gas sensor, which detects gas concentration such as oxygen concentration within a measuring atmosphere, and a method for manufacturing same.

BACKGROUND ART

Oxygen sensors made from various materials are known as detecting elements for detecting oxygen concentration. Patent Document 1, for example, discloses an oxygen sensor using composite ceramics generated by mixing $LnBa_2Cu_3O_{7-\delta}$ and $Ln_2BaCuO_5$ (Ln denotes rare earth element), which are material compositions for the oxygen sensor using a ceramic sintered body.

Figure 15:
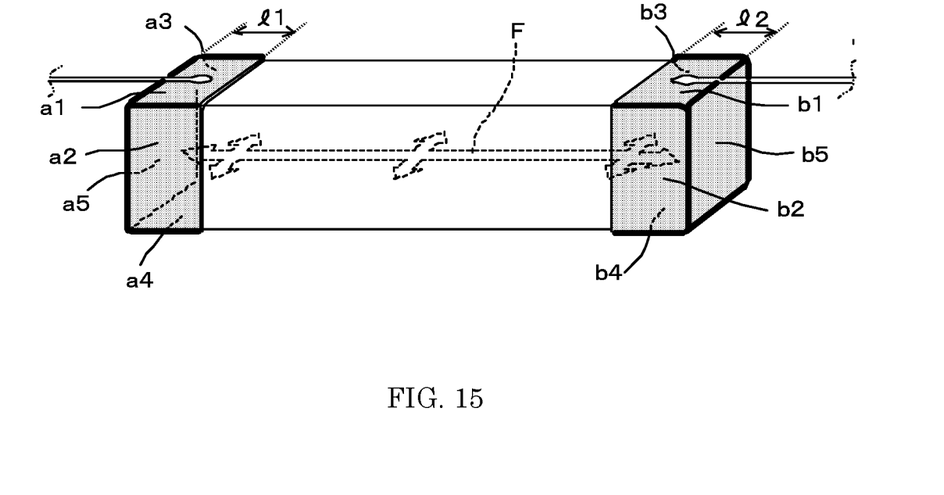
FIG. 15 is an external diagram of a conventional oxygen sensor provided with end-surface electrodes on five surfaces, schematically illustrating thermal stress due to thermal expansion.

A ceramic sintered body using the oxygen sensor is porous in composition, and is more fragile qualitatively than alumina substrate material. Moreover, the oxygen sensor having a linear body element shape has end-surface electrodes formed by coating both ends of the element in a cap form. Therefore, when the element shape is a prism, the end-surface electrode is coated on five surfaces (a1 to a5 and b1 to b5) of both ends of the element as shown in FIG. 15, for example.

PRIOR ART DOCUMENTS

Patent Document

Patent Document 1: JP 2007-85816A (U.S. Pat. No. 4,714,867)

DISCLOSURE OF THE INVENTION

Problem to be Solved by the Invention

The oxygen sensor using a ceramic sintered body detects oxygen concentration utilizing a hot spot phenomenon that a part of the linear member is red-heated when a voltage is applied. As a result, in the case of a structure in which the end-surface electrode is provided on five surfaces of the element ends as described above, there are problems that thermal stress generated in the electrode parts due to heat generation during operation cannot escape, and that degradation of the element in the electrode parts progresses quickly, thereby generating cracks in the electrode parts and electrode detachment.

That is, as schematically illustrated by a dotted line arrow F in FIG. 15, the electrode material expands and contracts in the axial direction of the element and the orthogonal direction thereto, stress is applied particularly on mutually touching portions (portions indicated by thick lines in FIG. 15, also referred to as edges) of the end-surface electrodes provided on the five surfaces of the element ends, increasing load of the thermal stress at these edges. As a result, there is a problem that cracks generate concentrated on the edges of the end-surface electrodes.

Moreover, conventional oxygen sensors employ a dipping method for manufacturing electrodes in which the ends of a linear body element are immersed in an electrode paste so as to coat electrode material. However, this method not only has poor productivity, but it requires deep or wide immersion in a dipping liquid in order to secure a sufficient area for the element and a lead wire to touch each other, and thereby variation easily occurs, and control easily becomes complicated. As a result, there is a problem that when securing the sensor element in a hollow tube, stability of the hollow structure cannot be acquired.

The problems described above also hold true when the sensor element is not a prism shape but a cylindrical shape, for example, and the case of coating the electrode material so as to cover side surface ends and end surfaces of the cylindrical element can be considered easily generating cracks in edges at which the side surface ends and the end surfaces touch.

In light of these problems, the present invention aims to prevent generation of cracks in electrode parts, electrode detachment, etc. in a gas sensor such as an oxygen sensor.

Means of Solving the Problem

The present invention aims to resolve the above problems, and includes the following structure, for example, as means for achieving the above aim. That is, the present invention is a gas sensor characterized in that it is made from a ceramic sintered body for detecting as gas concentration, either change in an electric current value or change in a resistance value measured when a voltage is applied to a sensor element. Paired electrode parts are provided on either end in an axial direction of the sensor element, and the paired electrode parts are formed avoiding regions where adjacent surfaces of the sensor element touch each other.

For example, it is characterized in that the sensor element is made from a prism-shaped linear body, and each of the paired electrode parts is formed on one of multiple surfaces constituting the linear body. It is characterized in that, for example, the electrode parts are formed either on one end and on the other end in the axial direction of the same side surface of the linear body, or on one end in an axial direction of a first side surface and on the other end in the axial direction of a second side surface facing the first side surface, or on one end in the axial direction of the first side surface and on the other end in the axial direction of a third side surface adjacent to the first side surface, or on one end surface and on the other end surface. It is also characterized in that, for example, the sensor element is made from a cylindrical linear body, and the electrode parts are formed either on one end and the other end in an axial direction of a side surface of the linear body, or on one end surface and the other end surface. It is further characterized in that, for example, the electrode parts formed on the one end and the other end in the axial direction of a side surface of the linear body are either formed so as to be successively wound along the circumferences of the one end and the other end while having a constant width in the axial direction, or formed so as to be wound while having a constant width in the axial direction and an interruption part disconnecting along the circumferences. Yet even further, for example, it is characterized in that paired electrode wires extending in either the axial direction of the sensor element or orthogonally to the axial direction are connected to respective electrode parts.

A manufacturing method for a gas sensor of the present invention made from a ceramic sintered body for detecting as gas concentration, change in an electric current value or change in a resistance value measured when a voltage is applied to a sensor element is characterized by including the steps of: manufacturing a first green sheet from slurry formed by mixing together raw materials for the sensor element; manufacturing a second green sheet on which electrodes are printed; forming a laminated body by stacking a plurality of the first green sheet and making the second green sheet a top layer or a top layer and a bottom layer; and cutting the laminated body to a predetermined size and baking, so as to manufacture a sensor element made from a linear body arranged such that the electrodes are paired in the axial direction. Gaps are formed between periphery of the linear body and peripheries of the electrodes.

Furthermore, a manufacturing method for a gas sensor made from a ceramic sintered body for detecting as gas concentration, change in an electric current value or change in a resistance value measured when a voltage is applied to a sensor element is characterized by including the steps of: manufacturing a green sheet from slurry formed by mixing together raw materials for the sensor element; forming a laminated body by stacking a plurality of the green sheet so as to form a laminated body; printing electrodes on one end of the top surface of the laminated body and on the other end of the bottom surface thereof; and cutting the laminated body to a predetermined size and baking, so as to manufacture a sensor element made from a linear body arranged such that the electrodes are paired in the axial direction. Gaps are formed between periphery of the linear body and peripheries of the electrodes.

Results of the Invention

According to the present invention, a gas sensor strong against heat cycles may be provided by eliminating concentration of thermal stress on the edges of a gas sensor element and thereby alleviating the thermal stress.

BRIEF DESCRIPTION OF DRAWINGS

FIGS. 4A-4B show external perspective views of oxygen sensors according to Working Example 3, wherein FIG. 4A illustrates an example of electrode wires extending in the axial direction of a sensor element, and FIG. 4B illustrates an example of electrode wires extending orthogonally to the axial direction of the sensor element;

FIGS. 5A-5B show external perspective views of oxygen sensors according to Working Example 4, wherein FIG. 5A illustrates an example of electrode wires extending in the axial direction of a sensor element, and FIG. 5B illustrates an example of electrode wires extending orthogonally to the axial direction of the sensor element;

FIGS. 7A-7B show external perspective views of oxygen sensors according to Working Example 6, wherein FIG. 7A illustrates an example of electrode wires extending in an axial direction of a sensor element, and FIG. 7B illustrates an example of electrode wires extending orthogonally to the axial direction of the sensor element;

DESCRIPTION OF EMBODIMENTS

Figure 1A:
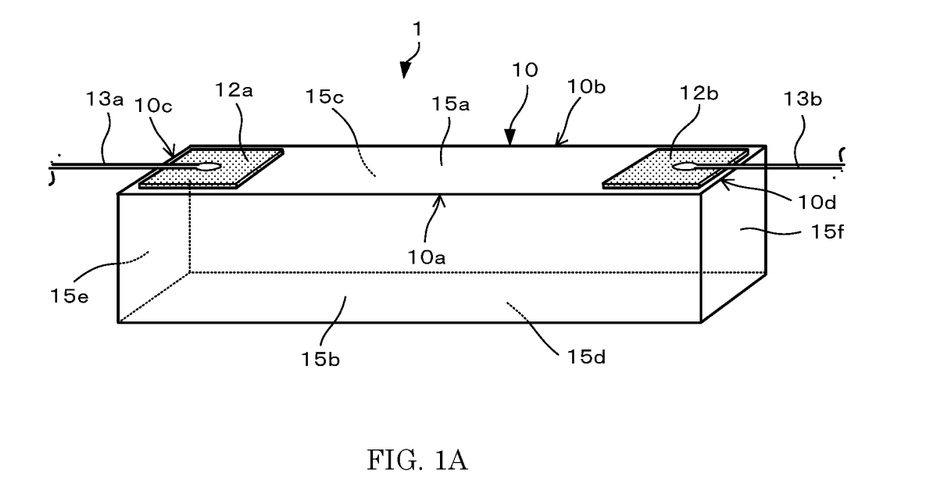
FIG. 1A is an external perspective view of an oxygen sensor according to an embodiment of the present invention.
Figure 1B:
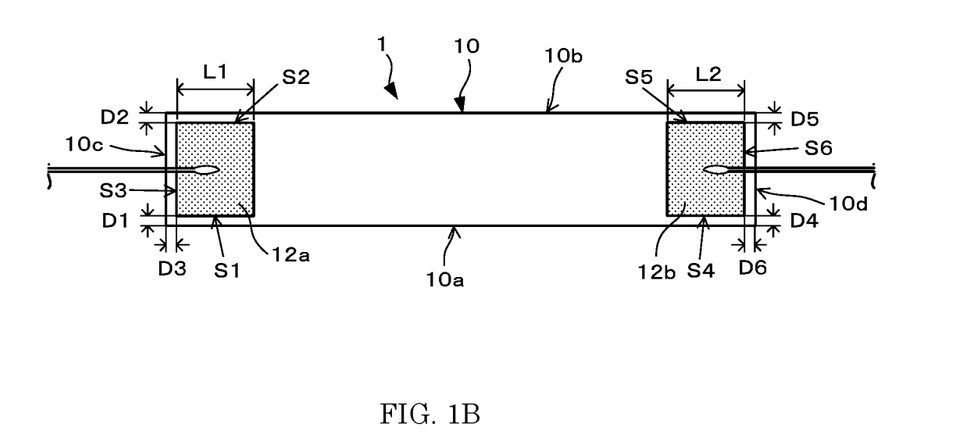
FIG. 1B is a plan view of the same.

An embodiment according to the present invention is described in detail below with reference to accompanying drawings. Here, an oxygen sensor is given and described as an example of the gas sensor. FIG. 1A is an external perspective view of an oxygen sensor according to the embodiment of the present invention, and FIG. 1B is a plan view of the same. An oxygen sensor 1 according to the embodiment, as illustrated in FIG. 1A, includes a sensor main body 10 made from a prism-shaped ceramic sintered body, electrodes 12a and 12b provided on either end of a side surface (upper surface) of the sensor main body 10, and electrode wires (lead wires) 13a and 13b connected to the electrodes 12a and 12b, respectively.

The sensor main body 10 is made from a ceramic sintered body resulting from mixing $LnBa_2Cu_3O_{7-\delta}$ and $Ln_2BaCuO_5$, for example, and has a linear body form processed to predetermined dimensions. In the above composition, Ln denotes rare earth element (e.g., Sc (scandium), Y (yttrium), La (lanthanum), Nd (neodymium), Sm (samarium), Eu (europium), Gd (gadolinium), Dy (dysprosium), Ho (holmium), Er (erbium), Tm (thulium), Yb (ytterbium), Lu (lutetium), etc.), and $\delta$ represents oxygen defect (0 to 1).

The sensor main body 10 of the oxygen sensor 1 according to the embodiment has a prism shape including four side surfaces 15a to 15d and two end surfaces 15e and 15f, as shown in FIG. 1A. The side surface 15a is the upper surface and the side surface 15d is the under surface in the state illustrated in FIG. 1A. Adjacent side surfaces touch each other edge to edge. Moreover, the side surfaces and the end surfaces also touch each other edge to edge.

Here, portions where one side surface and another side surface of the prism sensor main body 10 touch (meet) each other, namely a region where adjacent side surfaces touch each other and region where a side surface and an end surface touch each other are called ridges, side portions, or edges. More specifically, a region where the side surfaces 15a and 15b touch each other is a ridge 10a, and a region where the side surfaces 15a and 15c touch each other is a ridge 10b. Moreover, a ridge 10c lies between the side surface 15a and the end surface 15e, and a ridge 10d lies between the side surface 15a and the end surface 15f.

The electrodes 12a and 12b are paired electrodes arranged on either end in an axial direction of the side surface (upper surface) 15a, and are arranged at positions so as not to overlap (that is, not to touch) boundaries (ridges or edges) 10a, 10b, 10c, and 10d with other side surfaces and end surfaces.

Cause of generation of cracks in the conventional electrode structure described above is thought to be due to difference in coefficient of thermal expansion between linear members and electrode material that constitute the sensor main body. Accordingly, with the oxygen sensor 1 of the embodiment, an edge S1 of the electrode 12a and an edge S4 of the electrode 12b are positioned respectively at distances D1 and D4 from the ridge 10a so that the electrodes 12a and 12b do not touch (overlap) the ridge 10a.

Similarly, an edge S2 of the electrode 12a and an edge S5 of the electrode 12b are positioned respectively at distances D2 and D5 from the ridge 10b, an edge S3 of the electrode 12a is positioned at a distance D3 from the ridge 10c, and an edge S6 of the electrode 12b is positioned at a distance D6 from the ridge 10d so that they do not overlap the respective ridges.

Note that since the sensor main body 10 is a prism-shaped linear body but is made from a ceramic sintered body, the cross-sectional shape of the ridge portions (corners) when cutting orthogonally to the axial direction, for example, is not a shape with which surfaces meet and touch each other at right angles (formed angles are 90°), but is formed having rounded corners with roundness stipulated by a predetermined radius.

Therefore, the condition that the electrodes do not overlap (do not meet) the ridges (edges) is satisfied since all of the edge parts of the electrodes are also positioned at distances D1 to D6 described above such that they at least do not enter the rounded portions at respective element main body corners.

External shape, electrode arrangement, electrode wire extraction etc. of the oxygen sensor according to the embodiment are not limited to the example given in FIGS. 1A-1B, and various working examples may be assumed. These working examples are described below.

WORKING EXAMPLE 1

Figure 2:
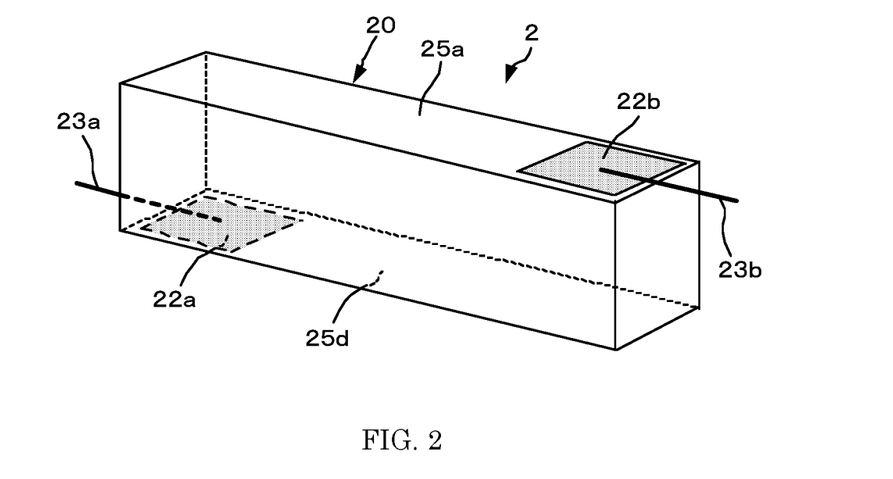
FIG. 2 is an external perspective view of an oxygen sensor according to Working Example 1.

An oxygen sensor 2 according to Working Example 1 illustrated in FIG. 2, similarly to the oxygen sensor 1 of FIGS. 1A-1B, is made from a prism-shaped ceramic sintered body, and has a structure including an electrode 22b on one end of a side surface (upper surface) 25a of a sensor main body 20, and an electrode 22a on one end of a side surface (under surface) 25d facing the side surface (upper surface) 25a and on the opposite side of the electrode 22b in the axial direction. Electrode wires 23a and 23b extending in the axial direction are connected to the respective electrodes 22a and 22b.

Even with the oxygen sensor 2 illustrated in FIG. 2, since the electrodes 22a and 22b are formed in an island shape while avoiding the edges of the sensor main body 20, gaps between these electrodes and edges will be escaping parts for expansion and contraction of the electrode material that accompany thermal expansion and contraction of the sensor main body. This allows elimination of concentration of thermal stress at the edge portions.

Note that with the oxygen sensor 2 illustrated in FIG. 2, the electrodes 22a and 22b on the respective side surfaces 25d and 25a are arranged diagonally opposed in the axial direction of the sensor main body 20, and therefore electric current within the sensor element flows linearly in thickness direction of the element toward the electrode on the opposing surface end. As a result, since the current path joining end to end of the element is a path through which the electric current passes uniformly even in thickness direction of the element, concentration of electric current within the sensor element may be suppressed, thereby attaining stabilization of gas concentration detecting characteristics, and preventing local temperature rise due to load decrease, which are ideal.

WORKING EXAMPLE 2

Figure 3:
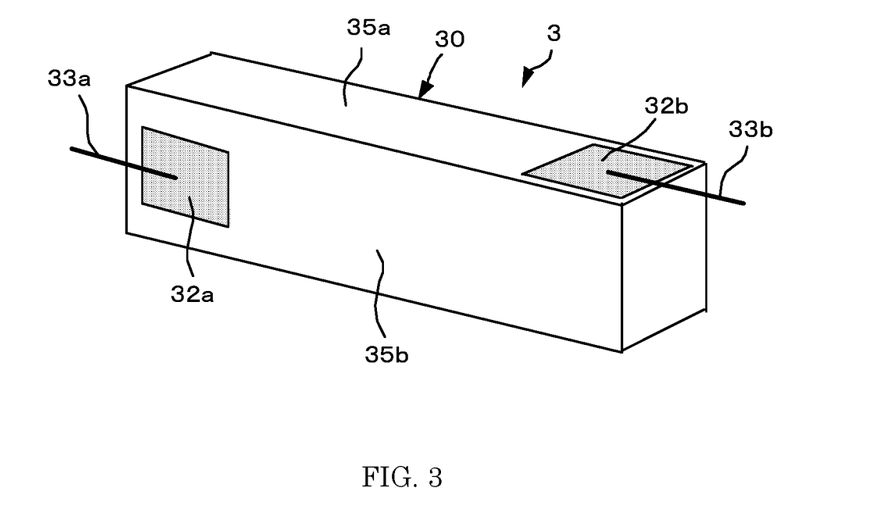
FIG. 3 is an external perspective view of an oxygen sensor according to Working Example 2.

An oxygen sensor 3 according to Working Example 2 illustrated in FIG. 3 has a structure including an electrode 32a, which is formed on one end of a side surface 35b of a sensor main body 30 that is made from a prism-shaped ceramic sintered body, and an electrode 32b, which is formed on one end of a side surface (upper surface) 35a and is opposite to the electrode 32a in the axial direction. An electrode wire 33a extending in the axial direction is connected to the electrode 32a, and an electrode wire 33b also extending in the axial direction is connected to the electrode 32b.

The electrodes 32a and 32b of the oxygen sensor 3 illustrated in FIG. 3 are also formed in an island shape avoiding the edges of the sensor main body 30, and gaps between these electrodes and edges will be escaping parts for expansion and contraction of the electrode material that accompany thermal expansion and contraction of the sensor main body. This eliminates concentration of thermal stress at the edge portions.

WORKING EXAMPLE 3

Figure 4A:
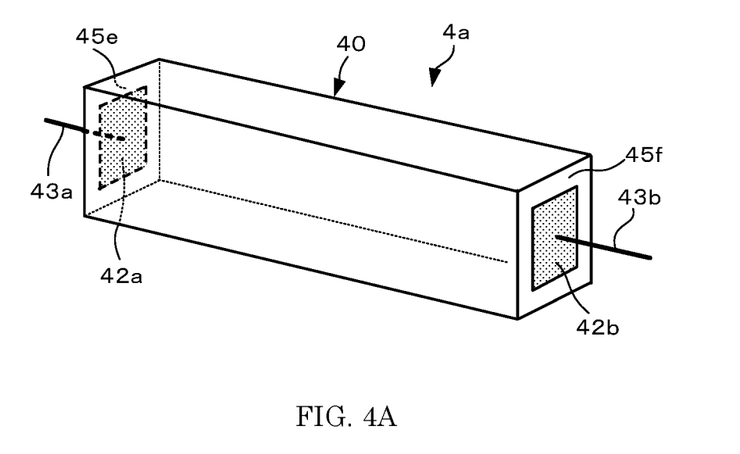
Figure 4B:
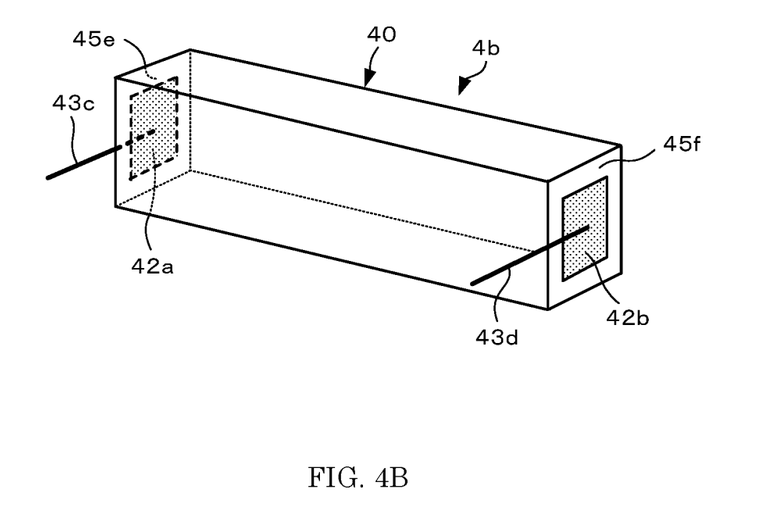

FIGS. 4A-4B shows external perspective views of oxygen sensors according to Working Example 3. The oxygen sensors of FIG. 4A and FIG. 4B differ only in the connecting direction of electrode wires to electrodes, and other structures are the same.

Both an oxygen sensor 4a of FIG. 4A and an oxygen sensor 4b of FIG. 4B include an electrode 42a provided on one end surface 45e of a sensor main body 40 that is made from a prism-shaped ceramic sintered body, and an electrode wire 43a connected to the electrode 42a. Moreover, they have a structure including an electrode 42b provided on the other end surface 45f of the sensor main body 40, and an electrode wire 43b connected to the electrode 42b.

The electrode wires 43a and 43b of the oxygen sensor 4a are attached so as to extend in an axial direction, and the electrode wires 43c and 43d of the oxygen sensor 4b are attached so as to extend orthogonally to the axial direction.

With the oxygen sensors 4a and 4b of FIGS. 4A-4B as well, the electrodes 42a and 42b are formed avoiding the edges (peripheries of the end surfaces 45e and 45f, and regions where their end surfaces and side surfaces touch each other) of the sensor main body 40. As a result, gaps between the electrodes and edges will be escaping parts for expansion and contraction of the electrode material that accompany thermal expansion and contraction of the sensor main body, thereby eliminating concentration of thermal stress at the edge portions.

Examples of the main body part of the oxygen sensor being made from a prism-shaped ceramic sintered body are given in FIGS. 1 to 4. However, the external shape of the element main body is not limited to the prism shape. The shape of the element main body is exemplified as a cylinder below.

WORKING EXAMPLE 4

Figure 5A:
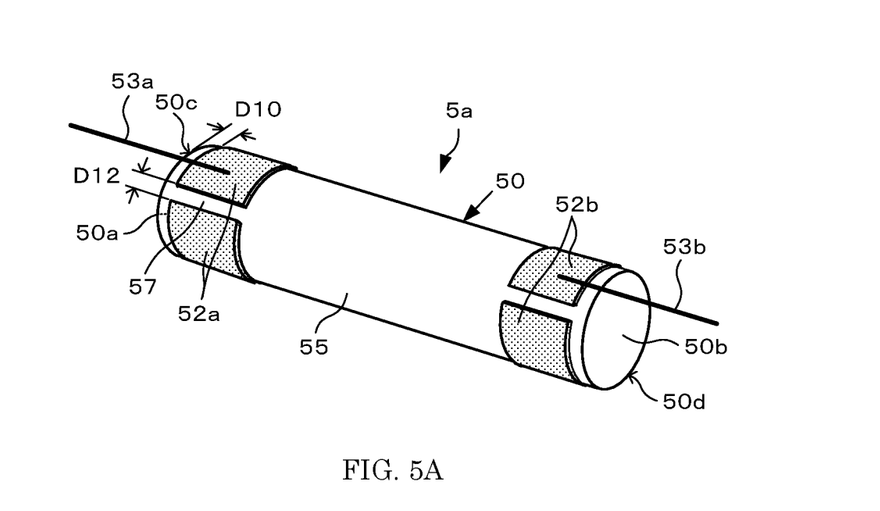
Figure 5B:
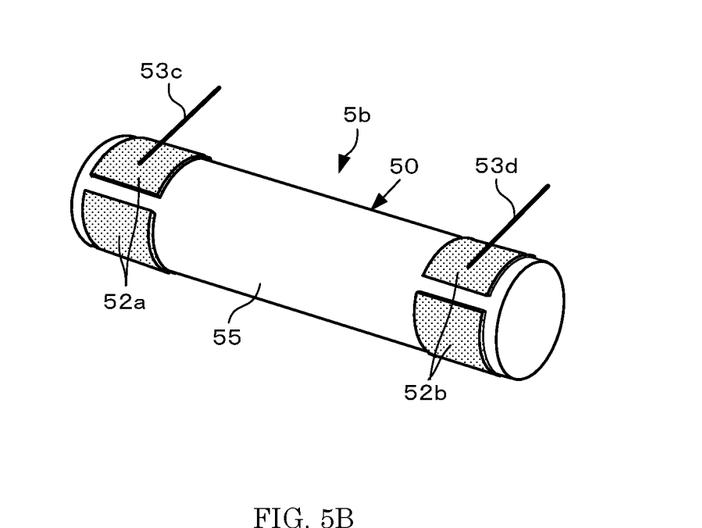

FIGS. 5A-5B shows external perspective views of oxygen sensors according to Working Example 4 having a cylindrical-shaped sensor main body. The oxygen sensors of FIG.

5A and FIG. 5B differ only in the connecting direction of electrode wires to electrodes, and other structures are the same.

More specifically, both an oxygen sensor 5a of FIG. 5A and an oxygen sensor 5b of FIG. 5B have a structure including an electrode 52a wound along the circumference on one end side of a side surface 55 of a sensor main body 50 while having a constant width in the axial direction, and an electrode 52b wound along the circumference on the other end side of the side surface 55 while having a constant width in the axial direction.

Here, an edge part along the circumference of the electrode 52a is positioned at a distance D10 from an edge 50c (periphery of the end surface 50a, and region touching the side surface 55) of the sensor main body 50, and the electrode 52a is formed disconnected along the circumference by an interruption part 57 so that the ends thereof face each other at a distance D12. Similarly, an edge part along the circumference of the electrode 52b is also positioned at a predetermined distance from an edge 50d of the sensor main body 50, and that electrode is formed disconnected along the circumference by an interruption part so that the ends thereof face each other at the predetermined distance.

Electrode wires 53a and 53b extending in the axial direction are connected to respective electrodes 52a and 52b of the oxygen sensor 5a. The oxygen sensor 5b includes electrode wires 53c and 53d extending orthogonally to the axial direction and connected to the respective electrodes 52a and 52b.

WORKING EXAMPLE 5

Figure 6:
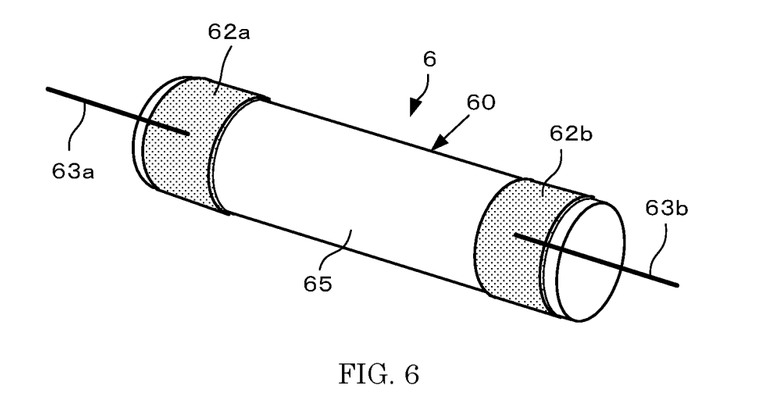
FIG. 6 is an external perspective view of an oxygen sensor according to Working Example 5.

An oxygen sensor 6 according to Working Example 5 illustrated in FIG. 6 is a modification of the oxygen sensor 5a illustrated in FIG. 5A, and includes electrodes 62a and 62b having a constant width in the axial direction, which are formed over the respective entire circumferences of one end and the other end of the side surface of a sensor main body 60. That is, the electrodes 62a and 62b do not have an interruption part for disconnecting along the circumference. Moreover, an edge part along the respective circumferences of the electrodes 62a and 62b is positioned at a predetermined distance from the edges, thereby forming gaps between the electrodes and the edges.

The oxygen sensor 6 has electrode wires 63a and 63b extending in the axial direction and connecting to the respective electrodes 62a and 62b as with the oxygen sensor 5a of FIG. 5A.

WORKING EXAMPLE 6

Figure 7A:
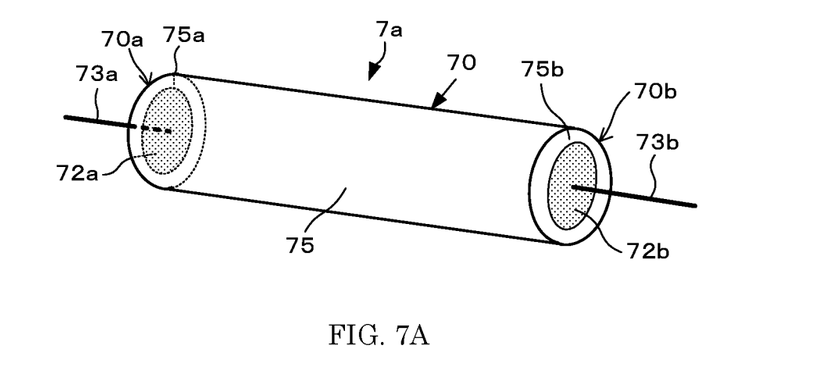
Figure 7B:
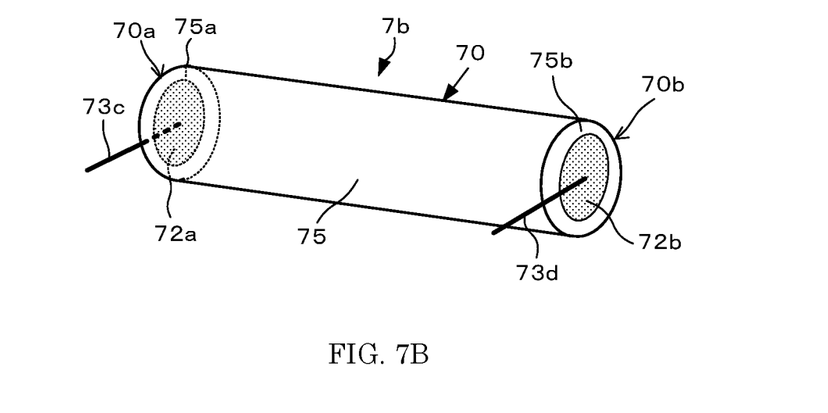

FIGS. 7A-7B shows external appearances of oxygen sensors according to Working Example 6. The oxygen sensors of FIG. 7A and FIG. 7B differ only in the connecting direction of electrode wires to electrodes, and other structures are the same.

Both an oxygen sensor 7a of FIG. 7A and an oxygen sensor 7b of FIG. 7B include an electrode 72a provided on one end surface 75a of a sensor main body 70 made from a cylindrical ceramic sintered body, and an electrode 72b provided on the other end surface 75b of the sensor main body 70. The oxygen sensor 7a has electrode wires 73a and 73b extending in the axial direction and connected to respective electrodes 72a and 72b, and the oxygen sensor 7b has electrode wires 73c and 73d extending orthogonally to the axial direction.

The oxygen sensors 7a and 7b of Working Example 6 have the electrodes 72a and 72b formed avoiding edge parts 70a and 70b (peripheries of the end surfaces 75a and 75b, and regions touching a side surface 75) of the sensor main body 70, forming gaps between the electrodes and the edge parts. As a result, escaping parts for expansion and contraction of the electrode material that accompany thermal expansion and contraction of the sensor main body are formed, thereby eliminating concentration of thermal stress at the edge portions.

WORKING EXAMPLE 7

Figure 8:
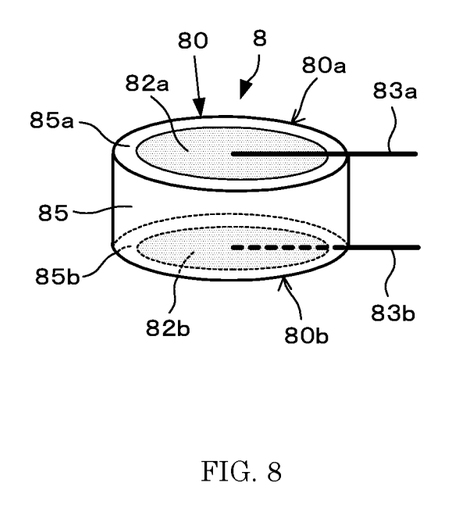
FIG. 8 is an external perspective view of an oxygen sensor according to Working Example 7.

An oxygen sensor 8 according to Working Example 7 of FIG. 8 is made from a cylindrical ceramic sintered body which is short in the axial direction. This oxygen sensor 8 has an electrode 82a provided on one end surface 85a of a cylindrical sensor main body 80, and an electrode 82b provided on the other end surface 85b. Electrode wires 83a and 83b extending orthogonally to the axial direction are connected to the respective electrodes 82a and 82b.

Even the oxygen sensor 8 has the electrodes 82a and 82b formed avoiding edge parts 80a and 80b (peripheries of the end surfaces 85a and 85b, and regions touching a side surface 85) of the sensor main body 80, and has gaps between the electrodes and the edge parts. As a result, escaping parts for expansion and contraction of the electrode material that accompany thermal expansion and contraction of the sensor main body are formed, thereby eliminating concentration of thermal stress at the edge portions.

Next, results of comparison and verification of the oxygen sensor according to the embodiment and a conventional oxygen sensor are described. Here, two types of sensors: a conventional oxygen sensor manufactured by forming electrodes on five end surfaces (see FIG. 15) of a sensor main body (called a conventional example), and the oxygen sensor according to the embodiment manufactured by forming electrodes on one end surface of the sensor main body (called a working example), are compared and verified.

Moreover, with either of the oxygen sensors described above, electrode material is adhered to tips of electrode wires, and the tips are baked and joined (electrode dipping) while touching the electrodes formed in the main body of the oxygen sensor.

This test is performed using a method of: connecting the respective oxygen sensors to a power source so as to send an electric current, and continuously repeating high temperature heating and cooling (repeating turning a hot spot ON and OFF) in a central portion of the oxygen sensor.

Table 1 gives the test results of when repeating the ON/OFF cycle of a hot spot both in the oxygen sensor according to the conventional example and the oxygen sensor according to the working example.

TABLE 1

| Test object | Times of repeating ON-OFF test | | |
| --- | --- | --- | --- |
| | 50,000 times | 70,000 times | 75,000 times |
| Working example | No degradation | No degradation | No degradation |
| Conventional example | No degradation | Degradation | — |

As shown in Table 1, when the ON-OFF cycle is repeated approximately 70,000 times on the oxygen sensor according to the conventional example in which electrodes are formed on five end surfaces of the sensor main body, a linear member having electrode parts on it has split (degradation of the electrode parts).

On the other hand, the oxygen sensor according to the working example in which electrodes are formed on one end surface of the sensor main body has not shown any degradation of electrode parts when repeating the ON-OFF cycle 50,000 times, 70,000 times, and 75,000 times.

That is, in the conventional example where the electrodes are formed on five end surfaces of the sensor main body, degradation, such as splitting of the electrodes at the edge portions (portions where electrodes of each surface touch each other) of the electrode parts, detachment of a part of the electrodes, etc. occurs notably.

In contrast, in the working example where the electrodes are formed on one end surface of the sensor main body, degradation such as splitting of the electrodes etc. does not occur until the ON-OFF cycle is repeated 75,000 times. This finding has confirmed the results of reducing the thermal stress load applied on the sensor element and preventing generation of cracks in the electrode parts by forming electrodes in one surface as in the working example, and thereby forming gaps between the electrodes and the edge parts.

Manufacturing methods for the oxygen sensor according to the embodiment are described next.

<First Manufacturing Method>

Figure 9:
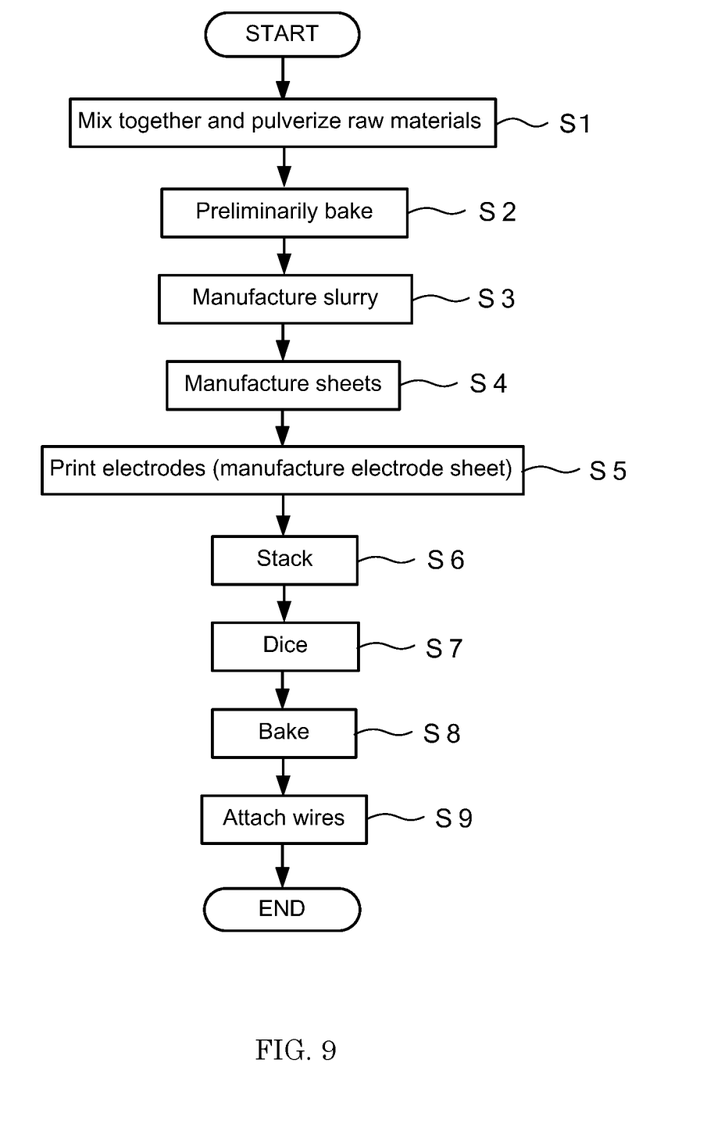
FIG. 9 is a flowchart showing manufacturing steps of a first manufacturing method for the oxygen sensor according to the embodiment.

A method of manufacturing an oxygen sensor by stacking electrode sheets etc. that result from printing electrodes on a green sheet is described as a first manufacturing method for the oxygen sensor according to the embodiment. FIG. 9 is a flowchart showing manufacturing steps for the oxygen sensor illustrated in FIGS. 1A-1B that has paired electrodes provided on either end of the same side surface of the sensor main body.

In step S1 of FIG. 9, raw materials for the oxygen sensor element are mixed together and pulverized. More specifically, $LnBa_2Cu_3O_{7-\delta}$ and $Ln_2BaCuO_5$ (Ln denotes rare earth element) are mixed together as materials for the oxygen sensor element, and the mixed raw materials are pulverized using a ball mill or the like, resulting in the same sized grains.

In step S2, the materials obtained in the step described above are subjected to heat treatment (preliminary baking) at 900 to 1000° C. In step S3, the preliminarily baked raw materials are pulverized using a ball mill or the like, resulting in the same sized grains, and then slurry is manufactured. Here, a binder resin (e.g., butyral resin (PVB)), a dispersant (e.g., sorbitan trioleate), a plasticizer (e.g., bis phthalate (2-ethylhexyl), DOP), and a diluting solvent (e.g., 2-ethylhexanol) are mixed together with the preliminarily baked materials.

Figure 10:
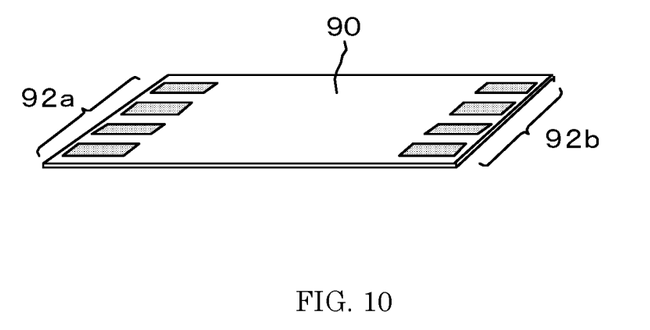
FIG. 10 is a diagram illustrating a green sheet on which electrode parts are printed on either end.

In step S4, a film is formed using a doctor blade so as to manufacture a green sheet of approximately 10 to 100 μm, for example. In subsequent step S5, as shown in FIG. 10, electrode material (e.g., silver (Ag) paste) for electrode parts to be positioned on either end of the sensor main body is printed so as to form electrode parts 92a and 92b, and thereby manufacturing an electrode sheet 90, which is a green sheet positioned on the top surface of a laminated body described later.

Figure 11:
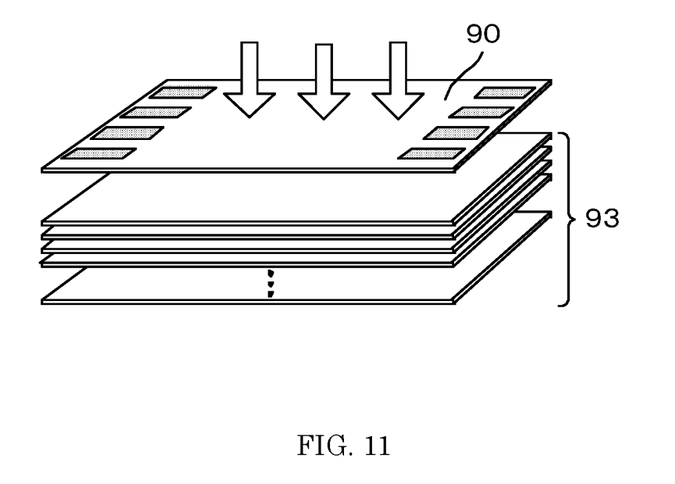
FIG. 11 is a diagram illustrating how to manufacture a laminated body from multiple green sheets on the top layer of which electrodes are printed.

In a laminating step of step S6, a laminated material made by stacking multiple green sheets 93 and the electrode sheet 90 that is mounted on the top layer of the green sheets 93, as illustrated in FIG. 11, is applied pressure using a uniaxial press, for example, so as to manufacture a laminated body having a predetermined thickness.

In step S7, the laminated body is cut (diced) in accordance with product size, thereby manufacturing a sensor element (linear body) in which paired electrodes are formed on either end of the same surface. In step S8, the diced, laminated body is baked in atmospheric air at, for example, 920° C. for 10 hours. Note that de-binding may be carried out on the laminated body before baking, and annealing may be performed on the laminated body after baking.

In step S9, electrode wires are connected to the electrode parts of the sensor element (linear body). Here, an electrode dipping method of adhering the same material as the electrode material of the electrode parts on tips of the electrode wires and baking and joining the tips while making them touch the electrode parts, a pulse heat method of instantly heating a joint using a pulse heat power source so as to solder or weld, wire bonding through ultrasonic vibration or thermocompression bonding, or a dispenser for coating a bonding agent on the joint may be used, for example.

Adoption of the printing method in the formation step of the electrode part described above allows further extension of the electrode part in the axial direction than that of the electrode using the conventional dipping method. More specifically, lengths L1 and L2 in the axial direction of the electrode parts in FIGS. 1A-1B and lengths l1 and l2 in FIG. 15 satisfy an inequality: (L1, L2)>(l1, l2), and thereby provide a wider area for connecting the electrode wires to the electrode than when using the conventional method.

<Second Manufacturing Method>

Figure 12:
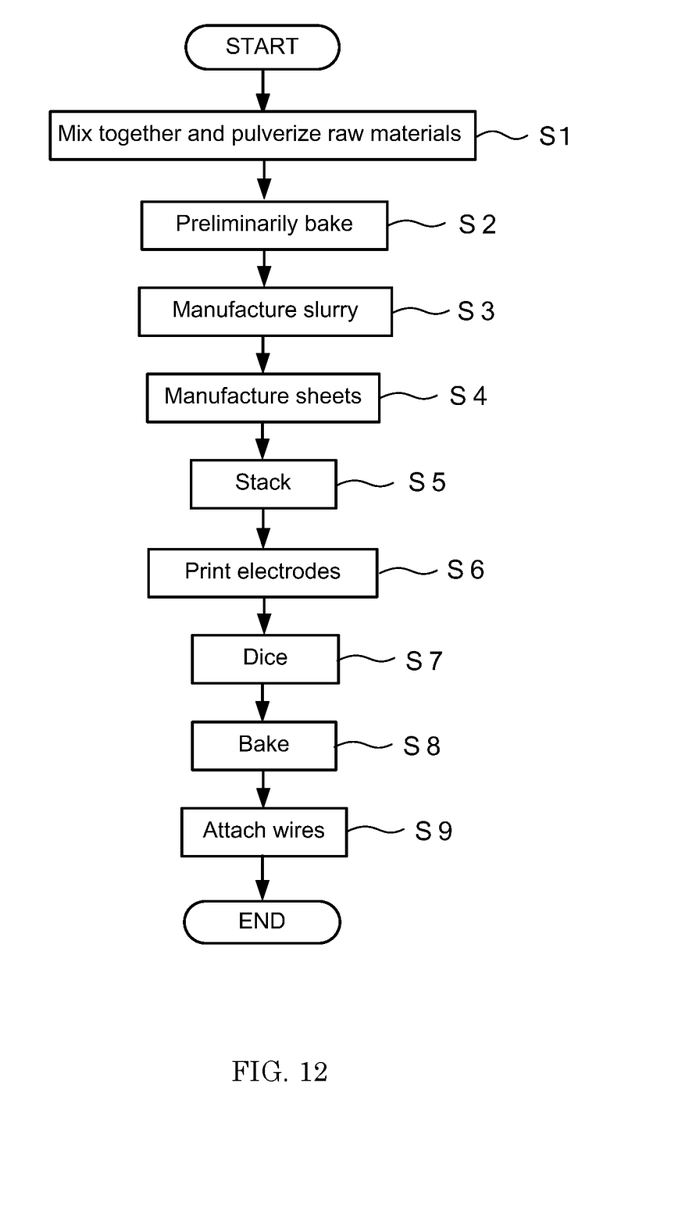
FIG. 12 is a flowchart showing manufacturing steps of a second manufacturing method for the oxygen sensor according to the embodiment.

A method of manufacturing an oxygen sensor by forming electrodes on a green sheet laminated body is described as a second manufacturing method for the oxygen sensor according to the embodiment. FIG. 12 is a flowchart showing manufacturing steps for the oxygen sensor illustrated in FIG. 2 that has an electrode provided on one end of a side surface (upper surface) of a sensor main body and on the other end of a side surface (under surface) facing the upper surface.

Note that since the same steps pertaining to the first manufacturing method given in FIG. 9 except for a laminating step and an electrode printing step described below are given in FIG. 12, description thereof is omitted here.

Figure 13:
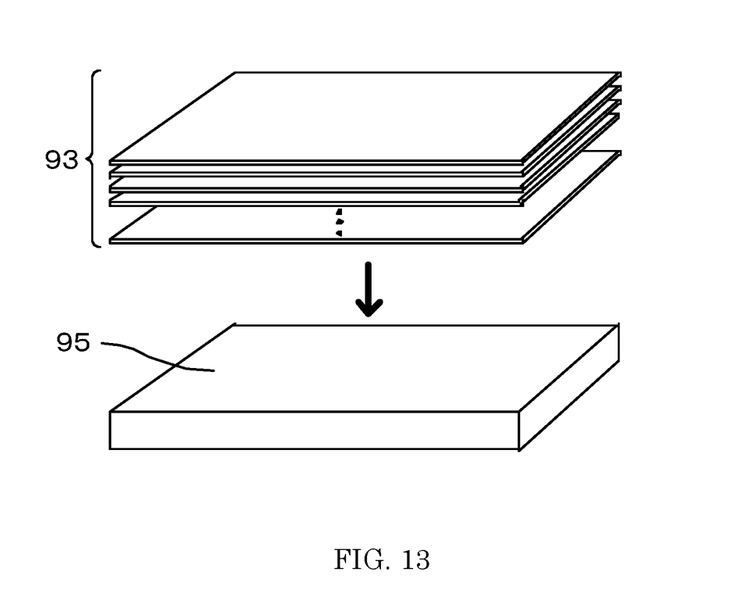
FIG. 13 is a diagram illustrating how to manufacture a laminated body by stacking multiple green sheets.

In step S5 of FIG. 12, a laminated material made by stacking multiple green sheets 93 as illustrated in FIG. 13 is applied pressure using a uniaxial press, for example, so as to manufacture a laminated body 95 having a predetermined thickness. In step S6, as shown in FIG. 14, electrode material (e.g., silver paste) is printed on one end of the top surface of the laminated body 95 described above so as to form an electrode part 102a, and in the same manner an electrode part 102b is formed on the other end of the bottom surface of the laminated body 95, thereby manufacturing a laminated body 100.

In the dicing step of step S7, the laminated body 100 is cut in accordance with product size, thereby manufacturing a sensor element (linear body) in which paired electrodes are formed on the one end of the upper surface and on the other end of the under surface.

Figure 14:
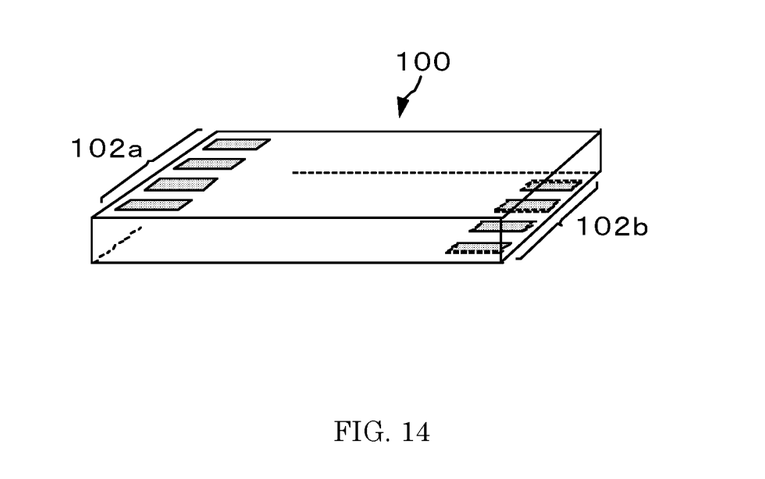
FIG. 14 is a diagram of a laminated body having electrode parts formed respectively on one end of the top surface and on the other end of the bottom surface.

Note that while a method of forming the electrode parts 92a and 92b on the same sheet and mounting the electrode sheet 90 on the top part has been described as an example of providing paired electrodes on either end of the same side surface of the sensor main body according to the first manufacturing method, a laminated body having the electrode arrangement of FIG. 14 may be manufactured by forming the electrode parts 92a and 92b on separate sheets and mounting each sheet on the top part and the bottom part.

Moreover, an example of providing each electrode on one end of a side surface (upper surface) of the sensor main body and on the other end of a side surface (under surface) facing the upper surface is given as the second manufacturing method. However, the second manufacturing method (method of forming electrodes on a laminated body) can be adopted even in the case of manufacturing an oxygen sensor by forming the electrodes on the same surface as in FIGS. 1A-1B.

The oxygen sensor according to the embodiment is a self-heating sensor that does not require a heater, and the central portion of the oxygen sensor element generates heat of a high temperature of approximately 900° C. when being connected to a power source and thereby receiving an electric current, wherein the heat generating portion (hot spot) will be an oxygen concentration detector. Therefore, it has a structure in which the oxygen sensor is stored inside a cylindrical glass tube, which is made of heat-resistant glass and has metal conductive caps (mouthpieces) made of copper (Cu) etc. fit on either end, for example.

Air holes are formed in end surfaces of the conductive caps, and the oxygen sensor within the glass tube is exposed to a gas to be measured for oxygen concentration flowing through the air holes.

The outer dimensions (size) of the oxygen sensor include, for example, a glass tube diameter of 5 mm, glass tube length of 20 mm, and air hole diameter of 2.5 mm. In addition, the oxygen sensor has a length of 5 mm, for example. Such dimensions make the oxygen sensor exchangeable via the air holes of the glass tube, for example.

On the other hand, in the case of making the oxygen sensor described above be a surface-mount type, which is surface-mountable, the oxygen sensor illustrated in FIGS. 1A-1B etc. does not have electrode wires, and paired electrodes formed on a surface of the sensor main body will be soldering regions. In that case, after the oxygen sensor is enclosed in a case such as the glass tube described above because it has a heat generating portion (hot spot), the electrodes formed in the sensor main body can be directly soldered on the conductive caps etc. of the glass tube instead of electrode wires. Therefore, manufacturing efficiency of the oxygen sensor is improved, and structure of the oxygen sensor itself can be simplified.

The oxygen sensor according to the embodiment as described above is made from a ceramic sintered body and detects oxygen concentration based on an electric current value measured when a voltage is applied, wherein gaps are formed between the peripheries of the electrodes formed in the sensor main body and the ridges at which the surfaces of the sensor main body touch each other. As a result, since the gaps will be escaping parts for expansion and contraction of the electrode material that accompany thermal expansion and contraction of the sensor main body, concentration of thermal stress at the edge portions may be eliminated, thereby alleviating the thermal stress on the oxygen sensor.

In other words, through use of a structure in which electrodes are formed on one end surface of the main body of the oxygen sensor while avoiding the edges of the main body wherein each electrode is formed in an island shape without providing other adjacent electrodes touching that electrode, all sides of the electrode are disconnected, and expansion and contraction towards the periphery of the electrode are thus not inhibited. This allows provision of an oxygen sensor that alleviates the thermal stress, is thus stronger against heat cycles, and is stably usable over a long period of time.

Moreover, conventionally, since the tips of the electrode wires and the sensor main body are grounded via a small area, and the sensor main body is supported by the tips of the electrode wires, burden on the grounding part is large. Therefore, with the oxygen sensor according to the embodiment, formation of electrodes using the printing method allows not only more improvement in productivity and quality of electrode than with the conventional clipping method, length of the electrode in the axial direction may be increased, thereby securing a larger electrode area.

Accordingly, a larger grounding area for the electrode wires relative to the sensor main body can be prepared, and burden from stress on the grounding part can be reduced, thereby preventing generation of cracks in the electrode. As a result, an oxygen sensor that can measure oxygen concentration under stable operation may be provided.

Moreover, in the case of using a structure in which electrodes are formed on the respective five surfaces of the element ends using the dipping method, film thickness of the electrodes at element corners is thinner, and thermal load particularly at ridge portions where three surfaces meet is larger. Therefore, formation of electrodes on one surface using the printing method as with the oxygen sensor of the embodiment described above provides a uniform and stable electrode film thickness.

EXPLANATION OF REFERENCES 1, 2-4, 5*a*, 5*b*, 6-8: Oxygen sensor
10, 20, 30, 40, 50, 60, 70, 80, 90: Sensor main body
10*a*-10*d*, 50*c*, 50*d*, 70*a*, 70*b*, 80*a*, 80*b*: Ridge (edge)
12*a*, 12*b*, 22*a*, 22*b*, 32*a*, 32*b*, 42*a*, 42*b*, 52*a*, 52*b*, 62*a*, 62*b*, 72*a*, 72*b*, 82*a*, 82*b*: Electrode
13*a*, 13*b*, 23*a*, 23*b*, 33*a*, 33*b*, 43*a*, 43*b*, 53*a*-53*d*, 73*a*, 73*b*, 83*a*, 83*b*: Electrode wire (lead wire)
15*a*-15*d*, 55, 65, 75, 85: Side surface
15*e*, 15*f*, 45*e*, 45*f*, 75*a*, 75*b*, 85*a*, 85*b*: End surface
57: Interruption part
90: Electrode sheet
93: Green sheet
95, 100: Laminated body

The invention claimed is:

1. A gas sensor made from a ceramic sintered body for detecting as gas concentration, either change in an electric current value or change in a resistance value measured when a voltage is applied to a sensor element, wherein
    paired electrode parts are each individually provided on opposite ends in the axial direction of the sensor element, and each of the paired electrode parts being printed to form an island shape with a uniform film thickness thereby avoiding regions of the sensor element where adjacent side surfaces of the sensor element touch each other and where the side surfaces and end surfaces touch each other.

2. The gas sensor according to claim 1, wherein the sensor element is made from a prism-shaped linear body, and each of the paired electrode parts is formed on one of multiple surfaces constituting the linear body.

3. The gas sensor according to claim 2, wherein the electrode parts are formed either on one end and on the other end in the axial direction of the same side surface of the linear body, or on one end in an axial direction of a first side surface and on the other end in the axial direction of a second side surface facing the first side surface, or on one end in the axial direction of the first side surface and on the other end in the axial direction of a third side surface adjacent to the first side surface, or on one end surface and on the other end surface.

4. The gas sensor according to claim 3, wherein paired electrode wires extending either in the axial direction of the sensor element or orthogonally to the axial direction are connected to respective electrode parts.

5. A manufacturing method for the gas sensor according to claim 1, which is made from a ceramic sintered body for detecting as gas concentration, either change in an electric current value or change in a resistance value measured when a voltage is applied to a sensor element; comprising the steps of:

manufacturing a first green sheet from slurry formed by mixing together raw materials for the sensor element;

manufacturing a second green sheet on which electrodes are printed;

forming a laminated body by stacking a plurality of the first green sheet and making the second green sheet a top layer, or a top layer and a bottom layer; and cutting the laminated body to a predetermined size and baking, so as to manufacture a sensor element made from a linear body arranged such that the electrodes are paired in the axial direction, wherein gaps are formed between periphery of the sensor element and peripheries of the paired electrodes so as for each of the paired electrode parts to be printed to form of in an island shape with a uniform film thickness thereby avoiding regions of the sensor element where adjacent side surfaces of the sensor element touch each other and where the side surfaces and end surfaces of the sensor element touch each other.

6. A manufacturing method for the gas sensor according to claim 1, which is made from a ceramic sintered body for detecting as gas concentration, either change in an electric current value or change in a resistance value measured when a voltage is applied to a sensor element; comprising the steps of:

manufacturing a green sheet from slurry formed by mixing together raw materials for the sensor element;

forming a laminated body by stacking a plurality of the green sheet;

printing electrodes on one end of the top surface of the laminated body and on the other end of the bottom surface of the laminated body; and cutting the laminated body to a predetermined size and baking, so as to manufacture a sensor element made from a linear body arranged such that the electrodes are paired in the axial direction, wherein gaps are formed between periphery of the sensor element and peripheries of the paired electrodes so as for each of the paired electrode parts to be printed to form of in an island shape with a uniform film thickness thereby avoiding regions of the sensor element where adjacent side surfaces of the sensor element touch each other and where the side surfaces and end surfaces of the sensor element touch each other.

\* \* \* \* \*